United States Patent
Baldwin et al.

(10) Patent No.: US 8,365,222 B2
(45) Date of Patent: Jan. 29, 2013

(54) ANIMATED STATION IDENTIFIER IN PROGRAM GUIDES

(75) Inventors: James A. Baldwin, Redwood City, CA (US); George K. Nyako, Santa Clara, CA (US)

(73) Assignee: Microsoft Corporation, Redmond, WA (US)

(*) Notice: Subject to any disclaimer, the term of this patent is extended or adjusted under 35 U.S.C. 154(b) by 624 days.

(21) Appl. No.: 12/359,153

(22) Filed: Jan. 23, 2009

(65) Prior Publication Data

US 2010/0192182 A1   Jul. 29, 2010

(51) Int. Cl.
H04N 5/445 (2011.01)
(52) U.S. Cl. .............. 725/45; 725/44; 709/219
(58) Field of Classification Search .......... 725/37–61; 709/217–232
See application file for complete search history.

(56) References Cited

U.S. PATENT DOCUMENTS

| | | | |
|---|---|---|---|
| 5,585,838 A * | 12/1996 | Lawler et al. ............ | 725/54 |
| 5,751,282 A | 5/1998 | Girard et al. | |
| 6,177,931 B1 * | 1/2001 | Alexander et al. ............ | 725/52 |
| 6,756,997 B1 | 6/2004 | Ward et al. | |
| 7,137,135 B2 | 11/2006 | Schein et al. | |
| 7,174,126 B2 | 2/2007 | McElhatten et al. | |
| 7,209,640 B2 | 4/2007 | Young et al. | |
| 2004/0034865 A1 | 2/2004 | Barrett et al. | |
| 2004/0237108 A1 | 11/2004 | Drazin et al. | |
| 2005/0086689 A1 * | 4/2005 | Dudkiewicz et al. .......... | 725/40 |
| 2008/0184306 A1 | 7/2008 | Ellis et al. | |

OTHER PUBLICATIONS

Patel, et al., "Google TV Search: Dual-Wielding Search and Discovery in a Large-Scale Product", retrieved at <<http://delivery.acm.org/10.1145/1460000/1453826/p95-patel.pdf?key1=1453826&key2=4127136221&coll=GUIDE&dl=GUIDE&CFID=10203081&CFTOKEN=49727169>>,uxTV'08, Oct. 22-24, 2008, Silicon Valley, California, USA, pp. 95-103.

* cited by examiner

Primary Examiner — Annan Shang
(74) Attorney, Agent, or Firm — Wolfe-SBMC

(57) ABSTRACT

A television program guide is displayed having a station identifier portion in a first location. A determination is made as to when a user navigates in the television program guide between past programs and future programs. In response to the user navigating in the television program guide between the past programs and the future programs, the station identifier portion is changed to a second location.

17 Claims, 9 Drawing Sheets

Fig. 2

| | On Now | 10:30 PM | 11:00 PM | 11:30 PM |
|---|---|---|---|---|
| 2 | One Potato | Two Potato | Three Potato | Four |
| 3 | American Politicians | | | Local News |
| 4 | Surviving Monkey Attacks | | | |
| 5 | | | | |
| 11 | Game Review | | Surviving Frostbite | |

Fig. 3

| | 8:30 PM | 9:00 PM | 9:30 PM | On Now | |
|---|---|---|---|---|---|
| | National News | Park Views | | One Potato | 2 |
| | Sat Happenings | | American Politicians | | 3 |
| | Surviving Monkey Attacks | | | | 4 |
| | | | | | 5 |
| | Table for 12 | Monkey Time | | Game Review | 11 |

400

| | 410 | | 406 | | 412 | |
|---|---|---|---|---|---|---|
| | 9:30 PM | On Now | | On Now | 10:30 PM | |
| 402 | Park Views | One Potato | 2 | One Potato | Two Potato |
| | American Politicians | | 3 | American Politicians | |
| | Surviving Monkey Attacks | | 4 | Surviving Monkey Attacks | |
| | | | 5 | | |
| | Monkey Time | Game Review | 11 | Game Review | |

Fig. 4

|     |       | On Now | 10:30 PM | 11:00 PM | 11:30 PM |
|-----|-------|--------|----------|----------|----------|
| Park.. | 2 | One Potato | Two Potato | Three Potato | Four |
| Ameri.. | 3 | American Politicians | | | Local News |
| Surviv.. | 4 | Surviving Monkey Attacks | | | |
|     | 5 | | | | |
| Game.. | 11 | Game Review | | Surviving Frostbite | |

ANIMATED STATION IDENTIFIER IN PROGRAM GUIDES

BACKGROUND

Television viewing and recording technology have been continually advancing, allowing hundreds of television channels to find their way into many homes. Despite such advances, problems still remain. One such problem is that it remains difficult for users to identify the various television programs that are available to them, and to distinguish between past and future programs that are available to them. This difficulty can be frustrating for users, and can result in user unfriendly experiences.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a television program guide is displayed having a station identifier portion in a first location. A determination is made as to when a user navigates in the television program guide between past programs and future programs. In response to the user navigating in the television program guide between the past programs and the future programs, the station identifier portion is changed to a second location.

In accordance with one or more aspects, a computing device includes a storage device and a program guide module. The storage device stores television program guide data. The program guide module is coupled to the storage device and retrieves the television program guide data from the storage device. The program guide module displays a television program guide that is based on the television program guide data and is a grid. A station identifier column is on a right side of the grid when the television program guide is displaying guide data for one or more programs that have already aired

BRIEF DESCRIPTION OF THE DRAWINGS

The same numbers are used throughout the drawings to reference like features.

FIGS. 2, 3, 4, 5, and 6 illustrate example television program guides displayed in accordance with one or more embodiments of the animated station identifier for program guides discussed herein.

DETAILED DESCRIPTION

An animated station identifier in program guides is discussed herein. A television program guide identifying various television channels or stations and the television programs available on those channels or stations at various times is displayed to the user. A station identifier portion of the guide changes locations based on whether the user is viewing data in the television program guide regarding future television programs or past television programs. For example, the station identifier portion can be a column on the left side of the guide when the user is viewing data regarding current and future television programs, and can change to being a column on the right side of the guide when the user is viewing data regarding past television programs. The station identifier portion can also change appearance when selected based on the availability of past television programs. This changing of location and/or appearance of the station identifier portion allows users to more easily distinguish between past and future programs when viewing the television program guide.

Figure 1:
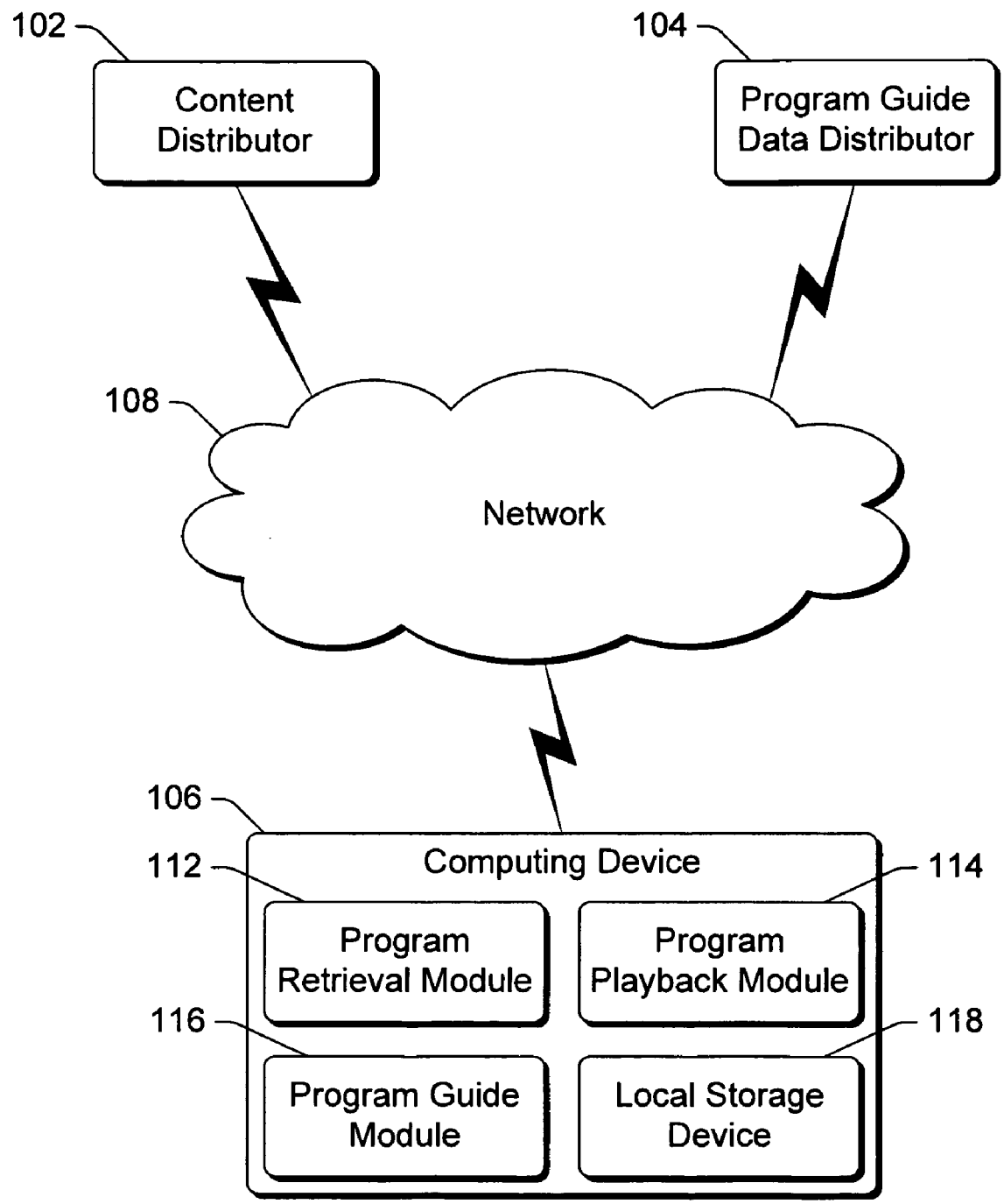
FIG. 1 illustrates an example system implementing the animated station identifier for program guides in accordance with one or more embodiments.

FIG. 1 illustrates an example system 100 implementing the animated station identifier in program guides in accordance with one or more embodiments. System 100 includes a content distributor 102 and a program guide data distributor 104 that can communicate with a computing device 106 via a network 108. Network 108 can be any of a variety of networks, including the Internet, a local area network (LAN), a wired or wireless telephone network, an intranet, other public and/or proprietary networks, combinations thereof, and so forth. In one or more embodiments network 108 is implemented to include an Internet Protocol (IP)-based network that facilitates content distribution and data communication between the distributors 102 and 104 and any number of consumer devices 106. An IP-based network is a network that supports communication among devices using IP, such as IP version 4 (IPv4, such as discussed in IETF RFC 791), as well as other versions such as IP version 6 (IPv6).

Content distributor 102 provides television programs to computing device 106. Content distributor 102 can obtain the television programs from one or more sources, such as a satellite operator, a network television operator, a cable operator, and so forth. These television programs can include a variety of different programs, such as television sitcoms, news broadcasts, documentaries, cartoon shows, movies, and so forth. These television programs can optionally include advertisements as well. Content distributor 102 can air television programs so that computing device 106 and optionally other computing devices can receive the television programs concurrently. The airing of a television program refers to the transmitting of the television program by a source or distributor via any transmission media. Alternatively, or in addition, television programs can be transferred to computing devices individually (e.g., via unicast sessions).

Television programs that are aired can be stored at least temporarily for later retrieval. A network buffer receives programs that are aired and stores the programs for later retrieval by computing devices. This network buffer can be implemented as part of content distributor 102, or alternatively one or more other devices (e.g., other devices coupled to network 108, other computing devices 106, and so forth). The storing of television programs allows the user to retrieve television programs for playback or recording after they have been aired.

In one or more embodiments, all television programs that are aired are stored in a network buffer temporarily. Alternatively, one or more filters can be imposed to restrict which programs are stored in the network buffer. The duration of the temporary storage can vary. For example, the duration can be 48 hours, 72 hours, 1 week, and so forth. It is to be appreciated that the exact duration of this temporary storage can vary by implementation and based on the desires of an operator of the network buffer.

Program guide data distributor 104 provides television program guide data to computing device 106. Program guide data distributor 104 can obtain the television program guide data from one or more sources, such as content distributor 102, a satellite operator, a cable operator, another third party, and so forth. The television program guide data is data describing television programs that are provided by content distributor 102. The television program guide data can be a variety of different data describing the television programs, such as titles, names of actors or actresses, summaries or descriptions, ratings, times that the programs are aired, and so forth. This television program guide data can be displayed to a user of computing device 106 in a television program guide, as discussed in more detail below.

Computing device 106 can be any of a variety of types of device. For example, a computing device 106 can be a desktop computer, a mobile station, an entertainment appliance, a television, a portable computer, a television set-top box, a cellular or other wireless phone, a gaming system, an automotive computer, and so forth. Thus, computing device 106 may range from a full resource device with substantial memory and processor resources (e.g., personal computers, game consoles) to a low-resource device with limited memory and/or processing resources (e.g., traditional set-top boxes, hand-held game consoles). Although one computing device 106 is illustrated in FIG. 1, it is to be appreciated that multiple computing devices of the same and/or different types can be coupled to network 108 and receive programs from content distributor 102 and program guide data from distributor 104.

Computing device 106 includes a program retrieval module 112, a program playback module 114, a program guide module 116, and a local storage device 118. Program retrieval module 112 obtains television programs from content distributor 102 for playback and/or recording by computing device 106. Program retrieval module 112 can store television programs in local storage device 118. Local storage device 118 can be included as part of computing device 106 (e.g., an internal disk drive of client device 106). Alternatively, local storage device 118 can be coupled to computing device 106, such as via a bus (e.g., an IEEE 1394 bus, a universal serial bus (USB), etc.), via a local network (e.g., a LAN), and so forth.

Program playback module 114 manages the playback of programs by computing device 106. Module 114 can play back programs from local storage device 118, and can also play back programs obtained by program retrieval module 112 as the programs are obtained. Computing device 106 can include display and/or audio playback components via which programs are played back, or alternatively computing device 106 can output a signal to one or more other components or devices which in turn can display and/or audibly play back the programs. The video content of programs can be played back on any type of television, monitor, LCD, projector, or similar television-based display system that renders video and/or image data. The audio content of programs can be played back on any type of television, stereo, or similar television-based audible playback system that renders audio data. Playback module 114 can play back programs that have been received in their entirety, as well as portions of programs (e.g., one part of a program can be played back while one or more other parts of the program are being received by program retrieval module 112).

Program guide module 116 manages display of a television program guide. Analogous to the display of video content discussed above, computing device 106 can include display components via which the television program guide is displayed, or alternatively computing device 106 can output a signal to one or more other components or devices which in turn can display the television program guide. This television program guide is also referred to as an electronic programming guide (EPG).

The television program guide includes identifiers of various programs that are available for playback, as well as the channel or station on which the programs are available and a time at which the programs are (or were) aired. Various parts of the program guide data received from distributor 104 can be displayed in the television program guide, such as the title of a program, a summary (or portion thereof) of a program, and so forth.

The user can navigate through the displayed television program guide in a variety of different manners to select a particular program that he or she desires to have played back. As the user navigates through the television program guide, different television programs are focused on. This focusing can be presented to the user in different manners, such as highlighting the identifier of the program that is focused on, displaying the identifier of the program that is focused on in a different font or color, and so forth. This navigation can be performed via a variety of different navigational inputs, such as directional or arrow keys on a remote control device or other device that communicates with device 106, directional or arrow keys or other buttons on device 106, on-screen buttons or menu items, verbal inputs, and so forth.

From the displayed television program guide, the user can select a particular television program to be played back and/or recorded. The user can select a television program in a variety of different manners, such as using an enter or other selection key on a remote control device or other device that communicates with device 106 when the television program is focused on, using an enter or other selection button on computing device 106, selecting an on-screen button or menu item, via verbal inputs, and so forth. This playback and/or recording can occur at computing device 106, or alternatively another device. For example, a user can navigate through the television program guide on computing device 106 to identify a program that he or she desires to have recorded or played back, and then a request to record or play back that program can be communicated to another computing device that records or plays back the program.

The television program guide can take a variety of different forms. Generally, the television program guide identifies particular programs that are (or were) aired on particular channels or stations at different times. A portion of the television program guide is a station identifier that identifies the particular television channels or stations for which data is being displayed at a given time. The station identifier portion is animated as the portion can change locations and/or appearance in the television program guide as discussed in more detail below.

In one or more embodiments, the television program guide is a grid having multiple columns and multiple rows. Each of the multiple rows displays information describing television programs available from a particular station or channel, and each of the multiple columns corresponds to different time slots. The grid can be scrolled up or down to display rows corresponding to additional stations or channels, and can be scrolled left or right to display columns corresponding to additional time slots. This scrolling can be performed in response to a variety of different navigational inputs, as discussed above. The grid also includes a column that is the station identifier portion, the station identifier column identifying the particular stations or channels to which the different rows being displayed correspond. This station identifier column is animated as the station identifier column can change locations and/or appearance as the user scrolls through different time slots as discussed in more detail below.

The television program guide can display identifiers of both future television programs and past television programs. Future programs refer to programs that are to be aired in the future (relative to the time that the television program guide is displayed), and past programs refer to programs that have already aired (relative to the time that the television program guide is being displayed). Thus, the television program guide can display identifiers of future programs that will be available to the user concurrently with, or at separate times as, identifiers of past programs that are available to the user. It is to be appreciated that one or more television programs are typically being aired when the television program guide is displayed. Such a current program, or a program that is "on now", can be viewed as a future program because part of the program remains to be aired, or a past program because part of the program has already aired. Accordingly, such current or "on now" programs can be treated as future programs and/or past programs.

FIGS. 2-6 illustrate example television program guides displayed in accordance with one or more embodiments of the animated station identifier in program guides discussed herein. It is to be appreciated that the television program guides illustrated in FIGS. 2-6 are only examples, and that other television program guides can be used in accordance with the animated station identifier in program guides discussed herein.

FIG. 2 illustrates a television program guide 200 in the form of a grid having multiple rows 202 and multiple columns 204. Each of the rows 202 displays information describing television programs available from a particular station or channel. Each of the columns 204 corresponds to a different time slot. The time slots in guide 200 are 30-minute time slots, although it is to be appreciated that time slots of other durations can alternatively be used. The guide 200 also has a station identifier column 206 on the left side of guide 200. Station identifier column 206 identifies the particular stations or channels to which the different rows 202 correspond. In the example of FIG. 2, station identifier column 206 displays television channel numbers. Alternatively, other station identifier or channel identifier information can be displayed in column 206, such as station call signs, names of stations or channels, and so forth.

Guide 200 allows the user to readily identify the particular programs that are available at particular future times on particular channels. For example, from guide 200 the user can readily see that a show titled "American Politicians" is now being aired on channel 3 and continues until 11:30 PM. By way of another example, from guide 200 the user can readily see that a show titled "Surviving Frostbite" will be aired starting at 11:00 PM on channel 11. By way of another example, from guide 200 the user can readily see that there are no programs being aired on channel 5 from the current time through 12:00 midnight.

If the user desires to see what television programs are available on other channels, then the user can navigate through guide 200 up (or down), causing the guide 200 to scroll or jump down (or up) to display the television programs available on other channels. If the user desires to see what television programs are available at times later than 11:30 PM, then the user can navigate through guide 200 to the right, causing the guide 200 to scroll or jump to the left to display television programs available further in the future beyond 11:30 PM. If the user desires to see what television programs are available at times earlier than the current time, then the user can navigate through guide 200 to the left, causing the guide 200 to scroll or jump to the right to display television programs that were aired before the current time.

In one or more embodiments, as the user navigates from the right to the left, different ones of columns 204 are focused on by the user. As the user navigates, the column that is focused on jumps from time slot to time slot. For example, each time the user inputs a request to navigate to the left (e.g., activates a left arrow key once), the column 204 that is focused on jumps from time slot to time slot, such as from 11:30 PM to 11:00 PM, then to 10:30 PM, and so on. Alternatively, the column that is focused on can jump from program to program. For example, each time the user inputs a request to navigate to the left (e.g., activates a left arrow key once), the column 204 that is focused on can jump from time slot 11:30 PM (during which a show titled "Surviving Frostbite" is aired on Channel 11) to time slot "on now" (during which a show titled "Game Review" is aired on Channel 11).

In one or more embodiments, when the user inputs a request to navigate to the left of the "on now" column (e.g., activates a left arrow key once when the "on now" column is focused on), then station identifier column 206 is focused on. As the user continues to navigate to the left (e.g., additional activations of the left arrow key), then guide 200 continues to scroll to the right to display past time slots as discussed in more detail below. Alternatively, when the user inputs a request to navigate to the left of the "on now" column (e.g., activates a left arrow key once when the "on now" column is focused on), then guide 200 can scroll to the right to display past time slots without station identifier column 206 having been focused on, as discussed in more detail below.

FIG. 3 illustrates a television program guide 300 in the form of a grid having multiple rows 302 and multiple columns 304. Analogous to television program guide 200 of FIG. 2, each of the rows 302 displays information describing television programs available from a particular station or channel, and each of the columns 304 corresponds to a different time slot. The guide 300 also has a station identifier column 306, analogous to column 206 of FIG. 2, that identifies the particular stations or channels to which the different rows 302 correspond. However, station identifier column 306 is on the right side of guide 300 rather than the left side.

Guide 300 allows the user to readily identify the particular programs that were aired at particular times on particular channels. Guide 300 is analogous to guide 200 of FIG. 2, except that guide 300 shows programs that have already aired whereas guide 200 shows programs that are aired in the future, and the location of the station identifier column is different in guides 200 and 300.

In one or more embodiments, television program guide 300 is displayed in response to station identifier column 206 of FIG. 2 being focused on. Alternatively, television program guide 300 can be displayed when the user navigates to the left of the "on now" column in guide 200 regardless of whether column 206 is focused on. Accordingly, when the user navigates in the television program guide from future programs towards past programs, the location of the station identifier column changes from the left side of the television program guide to the right side of the program guide. This provides an intuitive user interface (UI) for the user by placing the past programs to the left of the station identifier column, and placing the future programs to the right of the station identifier column, and allowing the user to navigate between the past and future programs.

Analogous to guide 200 of FIG. 2, if the user desires to see what television programs are available on other channels, then the user can navigate through guide 300 up (or down), causing the guide 300 to scroll or jump down (or up) to display the television programs available on other channels. If the user desires to see what television programs are available at times earlier than 8:30 PM, then the user can navigate through guide 300 to the left, causing the guide 300 to scroll or jump to the right to display television programs available further in the past before 8:30 PM. If the user desires to see what television programs are available at times later than the current time, then the user can navigate through guide 300 to the right, causing the guide 300 to scroll or jump to the left to display television programs that are to be aired after the current time.

Also analogous to the discussion of guide 200 of FIG. 2, in one or more embodiments when the user inputs a request to navigate to the right of the "on now" column (e.g., activates a right arrow key once when the "on now" column is focused on), then station identifier column 306 is focused on. As the user continues to navigate to the right (e.g., additional activations of the left arrow key), then the television program guide switches to guide 200 of FIG. 2 to display future time slots. Alternatively, when the user inputs a request to navigate to the right of the "on now" column (e.g., activates a right arrow key once when the "on now" column is focused on), then the television program guide switches to guide 200 to display future time slots without the station identifier column 306 having been focused on.

Thus, as can be seen from FIGS. 2 and 3, the station identifier portion of the television program guide can be referred to as animated because its location changes. In the specific examples shown, the station identifier portion changes from a location on the left side of the guide to a location on the right side of the guide when the user is navigating from future programs to past programs. The station identifier portion further changes from a location on the right side of the guide to a location on the left side of the guide when the user is navigating from past programs to future programs. The user can navigate between past programs and future programs in the television guide (including navigating from past programs towards future programs and navigating from future programs towards past programs) multiple times as desired.

In the examples of FIGS. 2 and 3, the station identifier column is discussed as being located on the left side of the television program guide or the right side of the television program guide. Alternatively, in response to the user navigating through the television program guide, the location of the station identifier column can change to different locations in the television program guide. For example, as the user navigates from the left to the right (from past programs towards future programs) in the television program guide, the station identifier column can change locations from the right side towards the left side of the television program guide. By way of another example, as the user navigates from the right to the left (from future programs towards past programs) in the television program guide, the station identifier column can change locations from the left side towards the right side of the television program guide.

The amount of the change in location of the station identifier portion as the user navigates through the television program guide can vary. In one or more embodiments, this change in locations is one time slot at a time (e.g., every half hour in the examples of FIGS. 2 and 3). In other embodiments, a number of potential station identifier portion locations can be determined, and in response to a navigation request the station identifier portion can change locations to the next one of these potential locations. For example, potential station identifier portion locations could be at locations one-third and two-thirds across the television program guide. By way of another example, potential station identifier portion locations could be at locations one-quarter, one-half, and three-quarters across the television program guide.

FIG. 4 illustrates a television program guide 400 in the form of a grid having multiple rows 402. Analogous to television program guide 200 of FIG. 2, each of the rows 402 displays information describing television programs available from a particular station or channel. Guide 400 also includes multiple columns 410 and 412, each corresponding to a different time slot. The guide 400 also has a station identifier column 406, analogous to column 206 of FIG. 2, that identifies the particular stations or channels to which the different rows 402 correspond.

Guide 400 differs from guides 200 and 300 in that station identifier column 406 is located between the right and left sides of guide 400. Guide 400 can be displayed in response to the user navigating to the right from the "on now" column of guide 300 of FIG. 3 or by the user focusing on station identifier column 306 of FIG. 3. Guide 400 can alternatively be displayed in response to the user navigating to the left from the "on now" column of guide 200 of FIG. 2 or by the user focusing on station identifier column 206 of FIG. 2.

In guide 400, columns 410 correspond to time slots of programs that have already aired and columns 412 correspond to time slots of programs that are aired in the future. An "on now" column is included in both columns 410 and columns 412. Alternatively, the "on now" column can be included in only one of columns 410 and columns 412.

Thus, as can be seen from FIGS. 2, 3 and 4, the station identifier portion of the television program guide is animated, changing to various locations in the guide. For example, when the television program guide is initially displayed, guide 200 of FIG. 2 can be displayed with the station identifier portion on the left side of the guide. When the user focuses on station identifier column 206, guide 400 of FIG. 4 can be displayed with the station identifier portion in the middle of the guide. When the user focuses on station column 406, or navigates to the left of the 9:30 PM time slot, guide 300 of FIG. 3 can be displayed with the station identifier portion on the right side of the guide.

In the examples of FIGS. 2, 3, and 4, the station identifier portion is animated changing its location. Alternatively, the station identifier portion can be animated in other manners. In one or more embodiments, the station identifier portion is animated by having it display an indication of the availability of programs that have already aired for one or more stations or channels. For example, not all programs that have already aired may be available for playback (e.g., not all programs may be stored by a network buffer as discussed above). Data regarding which programs have already aired is received by program guide module 116 of FIG. 1. The data can be received as part of the program guide data received from program guide data distributor 104 of FIG. 1, or can be received from another source (such as content distributor 102 of FIG. 1, a network buffer, and so forth) by program guide module 116 of FIG. 1 which can incorporate the data into the program guide data.

When the television program guide is displayed, for each station or channel identified in the station identifier portion, an indication of the availability of programs that have already aired on that station or channel can be displayed. This indication can persist until the user inputs another navigation request, or alternatively this indication can be temporary. For example, a temporary preview of one or more of the available programs that have already aired can be displayed for an amount of time (e.g., 5 seconds), and then the display of the temporary preview can cease.

The indication of the availability of programs that have already aired for one or more stations or channels can be displayed or otherwise presented in a variety of different manners. In one or more embodiments, an arrow or other indicator is included in the station identifier portion for each station or channel for which one or more programs that have already aired on that station or channel are available. In other embodiments, a portion of the television program guide is displayed as the indication of the availability of one or more programs that have already aired on a particular station or channel. This portion of the television program guide could be the next time slot (the next earliest time slot before the "on now" time slot), or a part of the next time slot in the past (e.g., one-half or one-quarter of the time slot). Alternatively, a window or box can be displayed as the indication of the availability of one or more programs that have already aired on a particular station or channel. This window or box can be, for example, a small window or box that is displayed when the station identifier portion is focused on. The small window or box can include a preview of the particular programs that are available (e.g., program titles or other data), or alternatively can just state the presence of one or more programs that have already aired.

Figure 5:
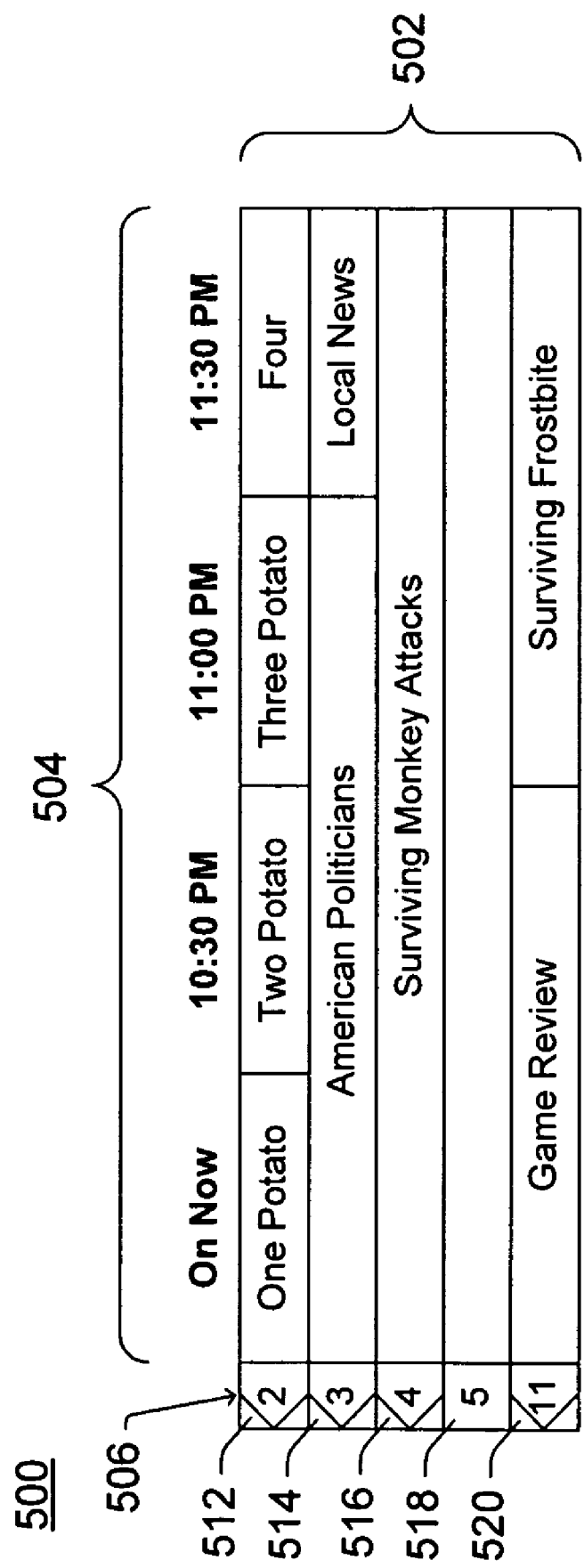

FIG. 5 illustrates a television program guide 500 in the form of a grid having multiple rows 502 and multiple columns 504. Analogous to television program guide 200 of FIG. 2, each of the rows 502 displays information describing television programs available from a particular station or channel, and each of the columns 504 corresponds to a different time slot. The guide 500 also has a station identifier column 506, analogous to column 206 of FIG. 2, that identifies the particular stations or channels to which the different rows 502 correspond. However, station identifier column 506 is animated to indicate the availability of one or more programs that have already aired.

Station identifier column 506 is animated to display an arrow in column 506 for each channel or station for which one or more programs that have already aired are available. In the example of FIG. 5, channel identifiers 512, 514, 516, and 520 are displayed with arrows to indicate that one or more programs that have already aired on those corresponding channels (channels 2, 3, 4, and 11, respectively) are available. Channel identifier 518 is displayed without an arrow to indicate that no programs that have already aired on the corresponding channel (channel 5) are available.

Although arrows are used in the example of FIG. 5 to indicate the availability of one or more programs on a channel, it is to be appreciated that other indicators can alternatively be used. For example, other symbols, characters, shapes, images, video clips, and so forth can be used rather than an arrow. By way of another example, the display of the channel identifiers can be changed, such as using a different background color, changing a font or color of the channel identifiers, and so forth.

In one or more embodiments, the arrows indicating the availability of one or more programs that have already aired are displayed in station identifier column 506 in response to station identifier column 506 being focused on. Alternatively, these arrows can be displayed in station identifier column 506 whenever column 506 is displayed.

Analogous to guide 200 of FIG. 2 and guide 300 of FIG. 3, the user can navigate through guide 500 up (or down) to see what television programs are available on other channels, and can also navigate through guide 500 to the left (or right) to see what television programs are available at other times. For example, if the user were to navigate to the left in guide 500 after focusing on station identifier column 506, the location of the station identifier column can change to the right side of the television program guide (e.g., as illustrated in FIG. 3), or to another location (e.g., as illustrated in FIG. 4).

FIG. 6 illustrates a television program guide 600 in the form of a grid having multiple rows 602 and multiple columns 604. Television program guide 600 is analogous to television program guide 500 of FIG. 5, except that rather than using arrows to indicate the availability of one or more programs that have already aired, part of the next time slot in the past (the next slot before the "on now" time slot) is displayed to give a preview of the one or more programs that have already aired.

In the example of FIG. 6, time slot parts 612, 614, 616, 618, and 620 are displayed next to the channel identifiers. For channels for which one or more programs that have already aired are available, a preview of the one or more programs that have already aired on those corresponding channels (channels 2, 3, 4, and 11) is displayed in time slot parts 612, 614, 616, and 620, respectively. In this example, the preview is at least a portion of a title of the most recently aired program on the corresponding channel (e.g., the data that is normally displayed in the time slots of the television program guide). Alternatively, data other than a title can be displayed, or data describing multiple programs that have already aired on the corresponding channel can be displayed. Additionally, in this example as portions of the programs on channels 3 and 4 were already aired, previews of these programs are also displayed. Alternatively, previews can be displayed only for programs that were already aired and are not currently being aired. For channels for which no programs have already aired (channel 5 in this example), no data is displayed in the corresponding time slot parts (time slot part 620).

FIGS. 2-6 illustrate example displays of television program guides employing embodiments of the animated station identifier in program guides. It is to be appreciated that these are only examples, and that the station identifier portion can be animated in a variety of different manners. For example, the station identifier portion can be animated to change locations when the station identifier portion is focused on, when the user navigates beyond the station identifier, when the user navigates to a time slot beyond the time slots currently displayed, and so forth. By way of another example, the orientation of the grid displayed as the television program guide can be changed, such as by having different columns display information describing television programs available from particular stations or channels, and different rows corresponding to different time slots. In this example, the station identifier portion would be a station identifier row that is animated rather than a station identifier column.

Additionally, it is to be appreciated that various changes can be made to the television program guides illustrated in FIGS. 2-6. For example, additional or fewer rows can be displayed in the television program guides. By way of another example, additional or fewer columns can be displayed in the television program guides. By way of yet another example, additional content available to the user can be displayed in the television program guides, such as video on demand (VOD) programming, applications, locally stored programs (e.g., programs stored on local storage device 118 of FIG. 1), and so forth.

Returning to FIG. 1, in one or more embodiments an initial television program guide is displayed each time the user requests display of the television program guide. This initial guide can be a fixed guide, such as showing a fixed set of channels and the station identifier portion being a column on the left side of the guide. This fixed guide can be a default fixed guide that program guide module 116 is configured to display, or alternatively can be a fixed guide specified by a user of computing device 106. Alternatively, this initial guide can be a variable guide that changes based on a current state or other settings of computing device 106. For example, the channels displayed can be based on a current channel being viewed or on the part of the television program guide being displayed the last time the guide was displayed. By way of another example, the station identifier portion can be on the left or right side (or other location) that is the same as it was being displayed the last time the guide was displayed, the station identifier portion can be on the left side of the guide and future programs displayed if the current program being played back is a program that is currently being aired, the station identifier portion can be on the right side of the guide and programs that have already aired can be displayed if the current program being played back is a program that has already aired, and so forth.

Figure 7:
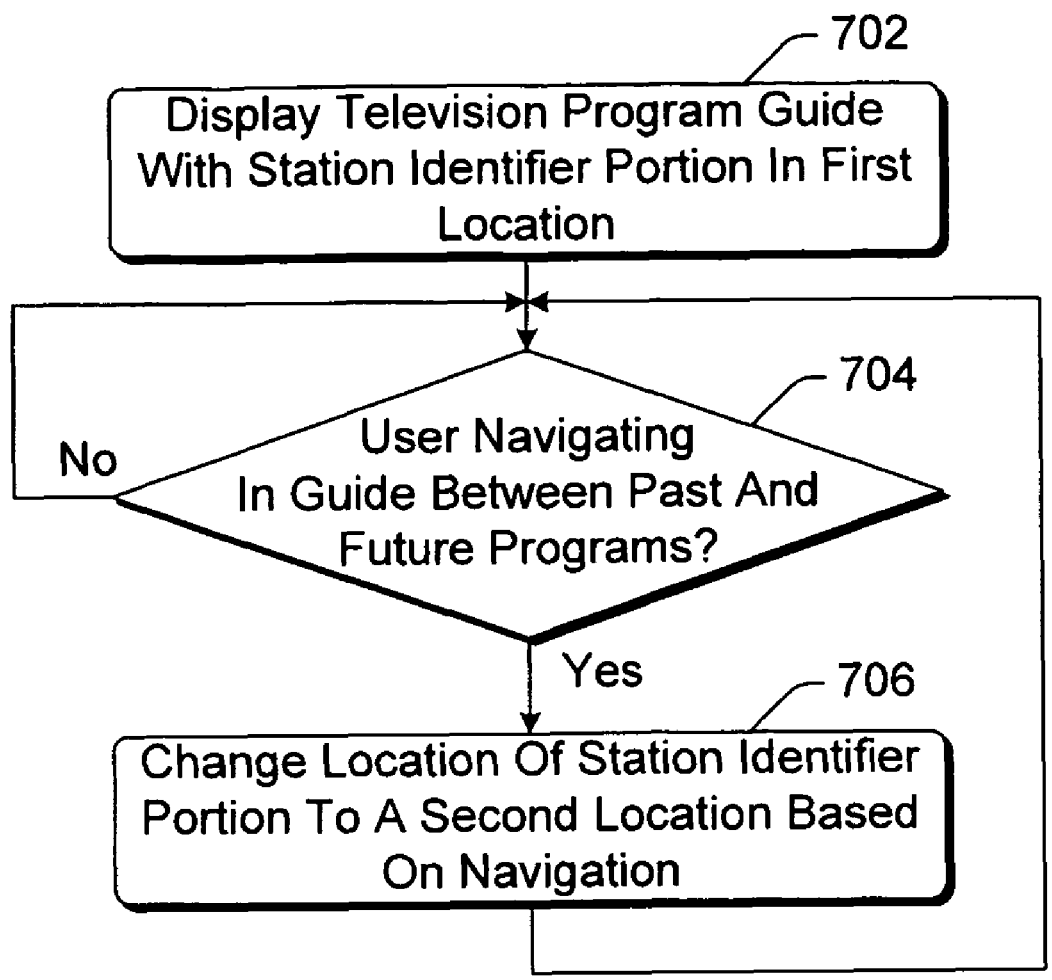
FIG. 7 is a flowchart illustrating an example process for using the animated station identifier in program guides in accordance with one or more embodiments.

FIG. 7 is a flowchart illustrating an example process 700 for using the animated station identifier in program guides in accordance with one or more embodiments. Process 700 is carried out by a computing device, such as a device 106 of FIG. 1, and can be implemented in software, firmware, hardware, or combinations thereof. Process 700 is an example process for using the animated station identifier in program guides. Additional discussions of the animated station identifier in program guides are included herein with reference to different figures.

In process 700, a television program guide is displayed with a station identifier portion in a first location (act 702). The station identifier portion can be in a variety of different locations as discussed above, such as the left side of a grid, the right side of a grid, or in between the left and right sides of a grid.

Process 700 proceeds based on determining whether a user is navigating between past television programs and future television programs (act 704). This navigating in act 704 can be navigating from past television programs towards future television programs, or from future television programs towards past television programs. As discussed above, this navigating can include focusing on the station identifier portion.

If the user is not navigating between past and future programs, then the display of the television program guide with the station identifier portion in the first location continues. However, if the user is navigating between past and future programs, then the location of the station identifier portion is changed to a second location based on this navigation (act 706). The new location of the station identifier portion can vary, as discussed above. Process 700 then returns to act 704, continuing to display the station identifier portion at the second location until it is determined that the user is again navigating between past television programs and future television programs.

The television program guide continues to be displayed until a guide termination request is received (e.g., an "exit" or "close" request input by the user, playback of a particular channel being requested by the user, the guide having been displayed for more than a threshold amount of time without input by the user, and so forth).

Figure 8:
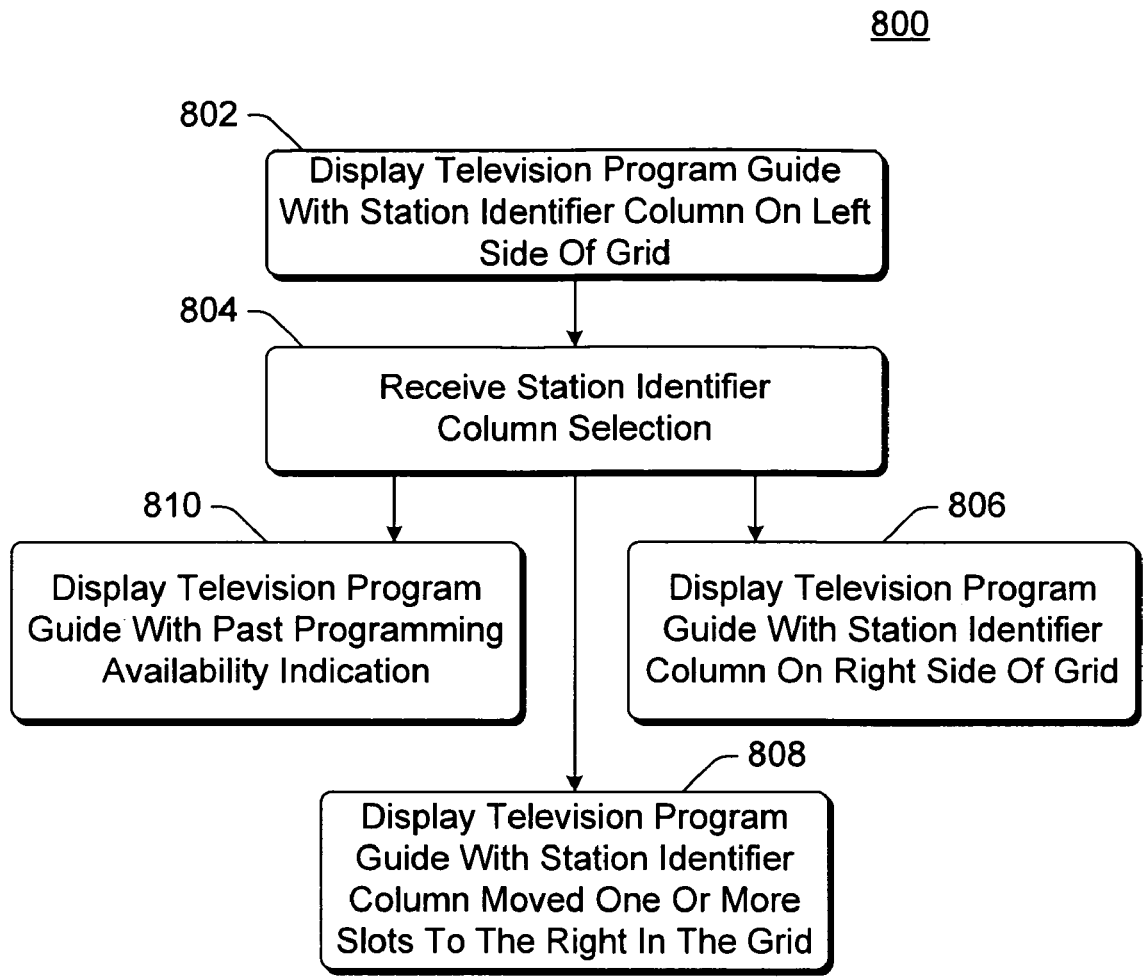
FIG. 8 is a flowchart illustrating another example process for using the animated station identifier in program guides in accordance with one or more embodiments.

FIG. 8 is a flowchart illustrating an example process 800 for using the animated station identifier in program guides in accordance with one or more embodiments. Process 800 is carried out by a computing device, such as a device 106 of FIG. 1, and can be implemented in software, firmware, hardware, or combinations thereof. Process 800 is an example process for using the animated station identifier in program guides. Additional discussions of the animated station identifier in program guides are included herein with reference to different figures.

In process 800, a television program guide is displayed with a station identifier portion on a left side of a grid (act 802). A selection of the station identifier column is then received (act 804). This selection is, for example, the user focusing on the station identifier column as discussed above.

In response to the selection of the station identifier column, one or more actions are taken depending on the configuration of the device implementing process 800. The device can be pre-configured to take one or more actions, or alternatively a user of the device can set preference or configuration settings identifying the one or more actions.

In one or more embodiments, in response to the selection of the station identifier column, the television program guide is displayed with the station identifier column on the right side of the grid (act 806). Time slots for times before the current time are also displayed in the television program guide, as discussed above. Subsequent navigation by the user can result in the station identifier column being again displayed on the left side of the grid, as discussed above.

Alternatively, in response to the selection of the station identifier column, the television program guide is displayed with the station identifier column moved one or more time slots to the right in the grid (act 808). This new location for the station identifier column can be halfway between the left and right sides of the grid, can be one time slot to the right of the left side of the grid, or can be another location in the grid as discussed above. Subsequent navigation by the user can result in the station identifier column being displayed one or more additional time slots to the right in the grid, and/or one or more time slots to the left in the grid as discussed above.

Alternatively, in response to the selection of the station identifier column, the television program guide is displayed with a past programming availability indication (act 810). This past programming availability indication can take a variety of different forms as discussed above, such as an indicator in the station identifier column, a part of a time slot, and/or a window including a preview of one or more of the particular programs that are available. Subsequent navigation by the user can result in the station identifier column being displayed one or more time slots to the right (e.g., as in act 808), and/or being displayed on the right side of the grid (e.g., as in act 806).

The television program guide continues to be displayed until a guide termination request is received (e.g., an "exit" or "close" request input by the user, playback of a particular channel being requested by the user, the guide having been displayed for more than a threshold amount of time without input by the user, and so forth).

Figure 9:
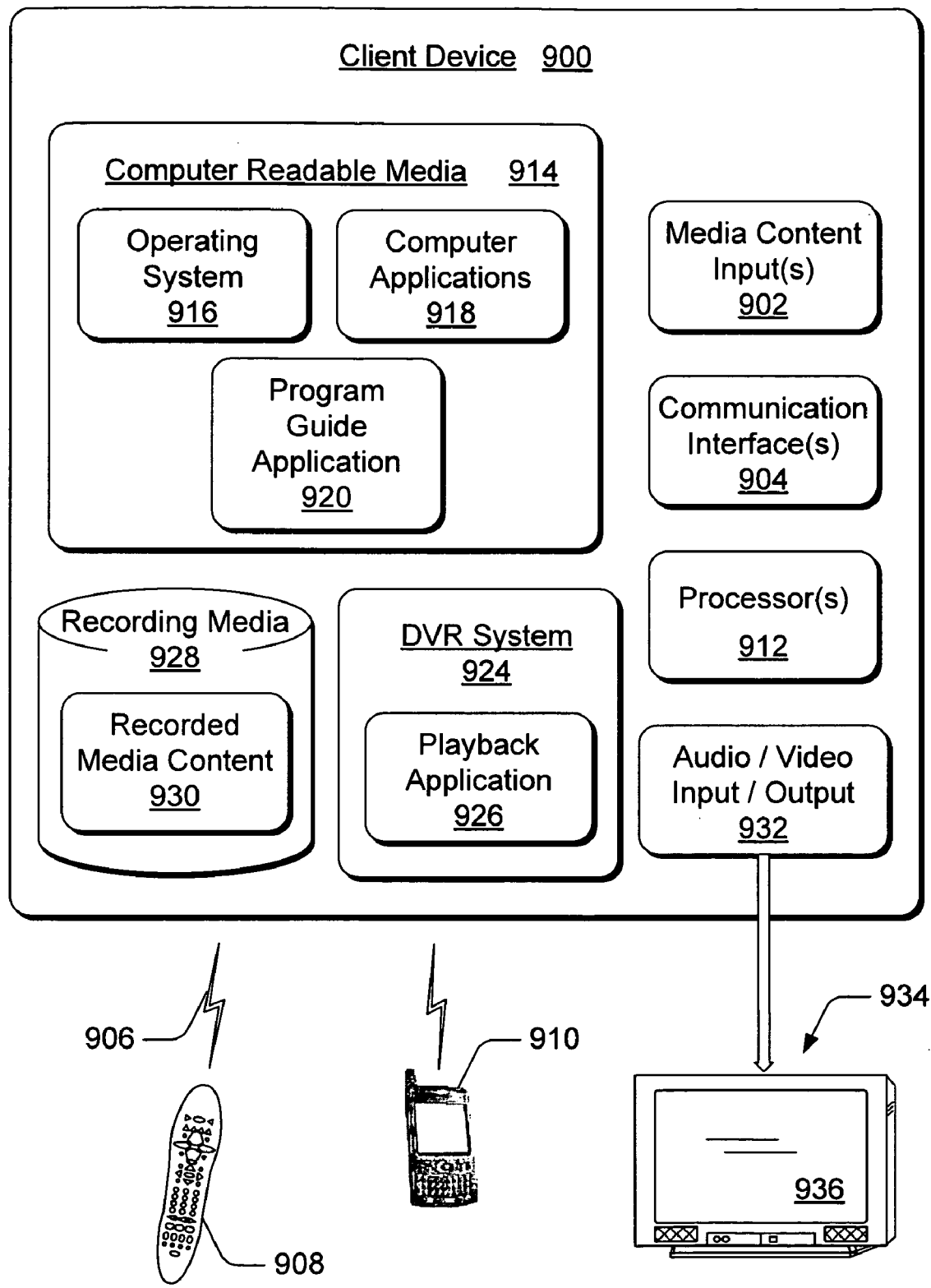
FIG. 9 illustrates various components of an example client device in accordance with one or more embodiments.

FIG. 9 illustrates various components of an example client device 900 that can be implemented as any form of a computing, electronic, or television client device to implement embodiments of the animated station identifier in program guides. For example, client device 900 can be implemented as a computing device 106 of FIG. 1. In various embodiments, client device 900 can be implemented as any one or combination of a television client device, a gaming system, or as any other computing-based device, such as a desktop computer, a portable computer, a television set-top box, a digital video recorder (DVR), an appliance device, a gaming console, and/or as any other type of computing-based client device.

Client device 900 includes one or more media content inputs 902 that may include Internet Protocol (IP) inputs over which streams of media content are received via an IP-based network. Client device 900 further includes communication interface(s) 904 that can be implemented as any one or more of a serial and/or parallel interface, a wireless interface, any type of network interface, a modem, and as any other type of communication interface. A wireless interface enables client device 900 to receive control input commands 906 and other information from an input device, such as from remote control device 908, a portable computing-based device (such as a cellular phone) 910, or from another infrared (IR), 802.11, Bluetooth, or similar RF input device.

A network interface provides a connection between client device 900 and a communication network by which other electronic and computing devices can communicate data with device 900. Similarly, a serial and/or parallel interface provides for data communication directly between client device 900 and the other electronic or computing devices. A modem facilitates client device 900 communication with other electronic and computing devices via a conventional telephone line, a DSL connection, cable, and/or other type of connection.

Client device 900 also includes one or more processors 912 (e.g., any of microprocessors, controllers, and the like) which process various computer-executable instructions to control the operation of device 900, to communicate with other electronic and computing devices, and to implement embodiments of the local recording of previously aired programming. Client device 900 can be implemented with computer-readable media 914, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer-readable media 914 provides data storage mechanisms to store various information and/or data such as software applications and any other types of information and data related to operational aspects of client device 900. For example, an operating system 916 and/or other computer applications 918 can be maintained as software applications with the computer-readable media 914 and executed on processor(s) 912 to implement embodiments of the local recording of previously aired programming.

Client device 900 can also include a program guide application 920 that is implemented to process program guide data and generate program guides for display. Program guide application 920 can be, for example, program guide module 116 of FIG. 1. A program guide enables a viewer to navigate through an onscreen display and locate various media content such as broadcast programs, recorded programs, video-on-demand programs and movies, interactive game selections, network-based applications, and other media content of interest to the viewer.

Client device 900 can also include a DVR system 924 with playback application 926, and recording media 928 to maintain recorded media content 930 that client device 900 downloads (or otherwise receives) and/or records. Further, client device 900 may access or receive additional recorded media content that is maintained with a remote data store (not shown). Client device 900 may also receive media content from a video-on-demand server, or media content that is maintained at a broadcast center or content distributor that distributes the media content to subscriber sites and client devices. The playback application 926 is a video control application that can be implemented to control the playback of media content, the recorded media content 930, and/or other video-on-demand media content, music, and any other audio, video, and/or image media content which can be rendered and/or displayed for viewing.

Client device 900 also includes an audio and/or video output 932 that provides audio and/or video data to an audio rendering and/or display system 934. The audio rendering and/or display system 934 can include any devices that process, display, and/or otherwise render audio, video, and image data. Video signals and audio signals can be communicated from client device 900 to a display device 936 via an RF (radio frequency) link, S-video link, composite video link, component video link, DVI (digital video interface), analog audio connection, or other similar communication link. Alternatively, the audio rendering and/or display system 934 can be implemented as integrated components of the example client device 900. Client device 900 along with the audio rendering and/or display system 934 is an example of a viewing system that can be implemented in a household viewing area for viewing television programs and/or receiving other television media content.

Figure 10:
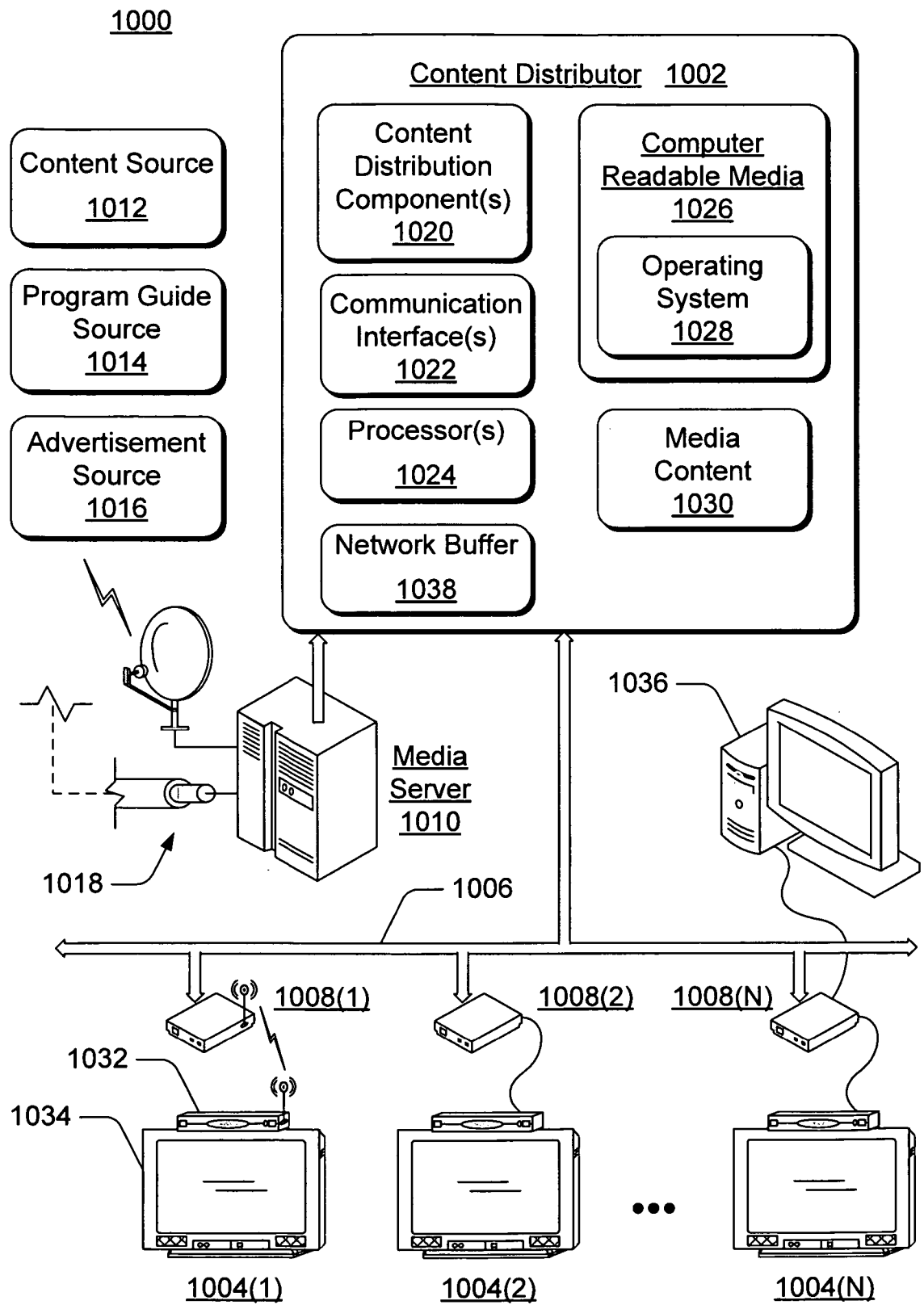
FIG. 10 illustrates an example entertainment and information system in which one or more embodiments of the animated station identifier in program guides can be implemented.

FIG. 10 illustrates an example entertainment and information system 1000 in which embodiments of the animated station identifier in program guides can be implemented. System 1000 facilitates the distribution of media content, program guide data, and advertising content to multiple viewers and to multiple viewing systems. System 1000 includes a content distributor 1002 and any number "N" of client systems 1004(1-N) each configured for communication via a communication network 1006. Content distributor 1002 can be a content distributor 102 of FIG. 1. Each client system 1004(1-N) can be a computing device 106 FIG. 1. Each of the client systems 1004(1-N) can receive data streams of media content, program content, program guide data, advertising content, closed captions data, and the like from content server(s) of the content distributor 1002 via the communication network 1006.

The communication network 1006 can be implemented as any one or combination of a wide area network (e.g., the Internet), a local area network (LAN), an intranet, an IP-based network, a broadcast network, a wireless network, a Digital Subscriber Line (DSL) network infrastructure, a point-to-point coupling infrastructure, or as any other media content distribution network. Additionally, communication network 1006 can be implemented using any type of network topology and any network communication protocol, and can be represented or otherwise implemented as a combination of two or more networks. A digital network can include various hardwired and/or wireless links 1008(1-N), routers, gateways, and so on to facilitate communication between content distributor 1002 and the client systems 1004(1-N).

System 1000 includes a media server 1010 that receives media content from a content source 1012, program guide data from a program guide source 1014, and advertising content from an advertisement source 1016. In one or more embodiments, the media server 1010 represents an acquisition server that receives the audio and video media content from content source 1012, an EPG server that receives the program guide data from program guide source 1014, and/or an advertising management server that receives the advertising content from the advertisement source 1016.

The content source 1012, the program guide source 1014, and the advertisement source 1016 control distribution of the media content, the program guide data, and the advertising content to the media server 1010 and/or to other servers. The media content, program guide data, and advertising content can be distributed via various transmission media 1018, such as satellite transmission, radio frequency transmission, cable transmission, and/or via any number of other wired or wireless transmission media. In this example, media server 1010 is shown as an independent component of system 1000 that communicates the program content, program guide data, and advertising content to content distributor 1002. In an alternate implementation, media server 1010 can be implemented as a component of content distributor 1002.

Content distributor 1002 is representative of a headend service in a content distribution system, for example, that provides the media content, program guide data, and advertising content to multiple subscribers (e.g., the client systems 1004(1-N)). The content distributor 1002 can be implemented as a satellite operator, a network television operator, a cable operator, and the like to control distribution of media content, program and advertising content, such as movies, television programs, commercials, music, and other audio, video, and/or image content to the client systems 1004(1-N).

Content distributor 1002 includes various content distribution components 1020 to facilitate media content processing and distribution, such as a subscriber manager, a device monitor, and one or more content servers. The subscriber manager manages subscriber data, and the device monitor monitors the client systems 1004(1-N) (e.g., and the subscribers), and maintains monitored client state information.

Although the various managers, servers, and monitors of content distributor 1002 (to include the media server 1010 in one or more embodiments) are described as distributed, independent components of content distributor 1002, any one or more of the managers, servers, and monitors can be implemented together as a multi-functional component of content distributor 1002. Additionally, any one or more of the managers, servers, and monitors described with reference to system 1000 can implement features and embodiments of the animated station identifier in program guides.

The content distributor 1002 includes communication interface(s) 1022 that can be implemented as any type of interface to communicate and receive data from client devices of the television system. The content distributor 1002 also includes one or more processors 1024 (e.g., any of microprocessors, controllers, and the like) which process various computer-executable instructions to control the operation of content distributor 1002. The content distributor 1002 can also include a network buffer 1038 that temporarily stores programs received from content source 1012 (e.g., via media server 1010). The content distributor 1002 can be implemented with computer-readable media 1026 which provides data storage to maintain software applications such as an operating system 1028 and media content 1030 for distribution to the client systems 1004(1-N).

The client systems 1004(1-N) can each be implemented to include a client device 1032 and a display device 1034 (e.g., a television, LCD, and the like). A client device 1032 of a respective client system 1004 can be implemented in any number of embodiments, such as a set-top box, a digital video recorder (DVR) and playback system, an appliance device, a gaming system, and as any other type of client device that may be implemented in an entertainment and information system. In an alternate embodiment, client system 1004(N) is implemented with a computing device 1036 as well as a client device. The computing device 1036 is an example of a connected data store that can record and maintain media content for a client device. Additionally, any client device 1032 of a respective client system 1004 can implement features and embodiments of the animated station identifier in program guides as described herein.

Generally, any of the processes or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer-readable memory devices, further description of which may be found with reference to FIGS. 9 and 10. The features of the animated station identifier in program guides described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a device, the method comprising:
    displaying a television program guide having a station identifier portion in one side of the television program guide, the station identifier portion identifying one or more television channels in the television program guide for which data is displayed;
    determining when a user navigates in the television program guide from future programs to past programs; and
    changing the station identifier portion to a different side of the television program guide in response to the user navigating in the television program guide from the future programs to the past programs.

2. A method as recited in claim 1, wherein the television program guide comprises a grid having multiple rows of channel identifiers and multiple columns of time slots, and where the station identifier portion is a column in the grid.

3. A method as recited in claim 1, where the one side comprises a left side of the television program guide, the determining comprises determining when the user navigates in the television program guide from the future programs to the past programs, and the different side comprises the right side of the television program guide.

4. A method as recited in claim 1, further comprising:
    determining when the user navigates in the television program guide from the past programs to the future programs; and
    changing the station identifier portion to the one side of the television program guide in response to the user navigating in the television program guide from the past programs to the future programs.

5. A method as recited in claim 4, wherein the determining when the user navigates in the television program guide from the past programs to the future programs comprises determining when the user focuses on the station identifier portion while the station identifier portion is in the different side of the television program guide.

6. A method as recited in claim 1, further comprising:
   determining when the user focuses on the station identifier portion while navigating from the future programs towards the past programs; and
   displaying, in response to the user focusing on the station identifier portion while navigating from the future programs towards the past programs, an indication for each channel identified in the station identifier portion for which one or more television programs that have already aired are available.

7. A method as recited in claim 6, wherein the indication that one or more television programs that have already aired are available for a channel comprises an indicator in the station identifier portion for the channel.

8. A method as recited in claim 6, wherein the indication that one or more television programs that have already aired are available for a channel comprises a part of a next time slot in the past in which a preview of at least one of the one or more television programs is displayed.

9. A computing device comprising:
   a storage device to store television program guide data; and
   a program guide module coupled to retrieve the television program guide data from the storage device, the program guide module configured to display a television program guide based on the television program guide data, the television program guide being a grid having a station identifier column on a right side of the grid when the television program guide displays the television program guide data for one or more programs that have already aired, and the grid having the station identifier column on a left side of the grid when the television program guide displays the television program guide data for future programs.

10. A computing device as recited in claim 9, wherein the program guide is further to:
    determine when a user navigates in the television program guide from the future programs towards the one or more programs that have already aired; and
    display the station identifier column on the right side of the grid in response to the user navigating in the television program guide from the future programs towards the one or more programs that have already aired.

11. A computing device as recited in claim 9, wherein the program guide is further to:
    determine when a user navigates in the television program guide from the one or more programs that have already aired towards the future programs; and
    display the station identifier column on the left side of the grid in response to the user navigating in the television program guide from the one or more programs that have already aired towards the future programs.

12. A computing device as recited in claim 11, wherein the program guide is further to:
    determine when the user focuses on the station identifier column while displayed on the left side of the grid; and
    display, in response to the user focusing on the station identifier column while displayed on the left side of the grid, an indication for each channel identified in the station identifier column for which one or more television programs that have already aired are available.

13. A computing device as recited in claim 12, wherein the indication that one or more television programs that have already aired are available for a channel comprises an indicator in the station identifier column for the channel.

14. A computing device as recited in claim 12, wherein the indication that one or more television programs that have already aired are available for a channel comprises a part of a next time slot in the past in which a preview of at least one of the one or more television programs is displayed.

15. A computing device as recited in claim 9, where the program guide module is further to display the station identifier column at a location between the left side of the grid and the right side of the grid in response to a user navigating in the television program guide from the one or more programs that have already aired towards the future programs.

16. A non-transitory one or more computer-readable media having stored thereon multiple instructions that, when executed by one or more processors of a device, cause the one or more processors to:
    display a television program guide as a grid having multiple rows of channel identifiers and multiple columns of time slots, and having a station identifier column on a left side of the grid;
    determine when a user focuses on the station identifier portion while navigating from future programs towards past programs;
    change the station identifier column to a right side of the grid in response to the user focusing on the station identifier portion while navigating from the future programs to the past programs;
    determine when the user focuses on the station identifier portion while navigating from the past programs towards the future programs; and
    change the station identifier column to the left side of the grid in response to the user focusing on the station identifier portion while navigating from the past programs to the future programs.

17. A non-transitory one or more computer-readable media as recited in claim 16, wherein the multiple instructions further cause the one or more processors to:
    determine when the user focuses on the station identifier column while displayed on the left side of the grid; and
    display, in response to the user focusing on the station identifier column while displayed on the left side of the grid, an indication for each channel identified in the station identifier column for which one or more television programs that have already aired are available.

* * * * *